(12) United States Patent
Stiliadis

(10) Patent No.: US 8,806,554 B2
(45) Date of Patent: *Aug. 12, 2014

(54) MULTIMEDIA MARKETING AND DISTRIBUTION SYSTEM

(76) Inventor: Nicholas Stiliadis, Toronto (CA)

( * ) Notice: Subject to any disclaimer, the term of this patent is extended or adjusted under 35 U.S.C. 154(b) by 3 days.

This patent is subject to a terminal disclaimer.

(21) Appl. No.: 13/310,704

(22) Filed: Dec. 3, 2011

(65) Prior Publication Data

US 2012/0079530 A1    Mar. 29, 2012

Related U.S. Application Data

(63) Continuation of application No. 12/538,669, filed on Aug. 10, 2009, now Pat. No. 8,099,754, which is a continuation-in-part of application No. 09/840,283, filed on Apr. 23, 2001, now Pat. No. 7,574,725.

(51) Int. Cl.
  *H04N 7/173*  (2011.01)
  *H04N 21/218*  (2011.01)
  *H04N 21/2225*  (2011.01)
  *G06Q 30/02*  (2012.01)

(52) U.S. Cl.
  CPC ....... *H04N 21/2181* (2013.01); *H04N 21/2225* (2013.01); *G06Q 30/0201* (2013.01); *G06Q 30/0241* (2013.01); *G06Q 30/0251* (2013.01)
  USPC .......................................................... 725/114

(58) Field of Classification Search
  USPC .......................................................... 725/114
  See application file for complete search history.

(56) References Cited

U.S. PATENT DOCUMENTS

| | | | |
|---|---|---|---|
| 5,412,416 A | 5/1995 | Nemirofsky | |
| 5,564,043 A | 10/1996 | Siefert | |
| 5,661,517 A | 8/1997 | Budow et al. | |
| 5,918,213 A | 6/1999 | Bernard et al. | |
| 5,924,013 A | 7/1999 | Guido et al. | |
| 6,038,367 A | 3/2000 | Abecassis | |
| 6,038,545 A | 3/2000 | Mandeberg et al. | |
| 6,141,530 A | 10/2000 | Rabowsky | |
| 6,233,523 B1 | 5/2001 | Sood | |

(Continued)

FOREIGN PATENT DOCUMENTS

| | | |
|---|---|---|
| WO | 95/05050 | 2/1995 |
| WO | 00/07130 | 2/2000 |

OTHER PUBLICATIONS

Bruce Hershenson, "A History of Movie Posters", 1998 [http://www.reelclassics.com/Articles/General/posters-article.htm].

(Continued)

*Primary Examiner* — Dominic D Saltarelli
(74) *Attorney, Agent, or Firm* — Handal & Morofsky LLC

(57) ABSTRACT

A central server having a computer readable storage media for storing multimedia material, such as motion pictures and television programming, in digital format is connected to a communications network such as the Internet. Exhibitors, such as theaters and television stations, can access the central server, preview available programming, verifying the ownership of such material, review contract provisions for obtaining and paying for the desired programming, and download the programming along with marketing materials for the program or movie. The central server loads material onto the storage media as its received from producers and owners of such material. In addition, central server retains data retains data regarding requests for material, such as titles requested, who requested such, and where the requestors are located geographically. This information can be used to help producers market their material more economically.

2 Claims, 11 Drawing Sheets

(56) References Cited

U.S. PATENT DOCUMENTS

| | | | |
|---|---|---|---|
| 2001/0054180 A1 | 12/2001 | Atkinson | |
| 2002/0056081 A1 | 5/2002 | Morley et al. | |
| 2002/0069107 A1 | 6/2002 | Werner | |
| 2002/0094787 A1 | 7/2002 | Avnet et al. | |
| 2002/0162113 A1 | 10/2002 | Hunter | |
| 2003/0172374 A1 | 9/2003 | Vinson et al. | |
| 2004/0093608 A1 | 5/2004 | Sprogis | |

OTHER PUBLICATIONS

Hollywood Software, Inc. Product Brochure "Rightsmart.com" (date unknown).
LuxSat International SA Product Brochure "Multimedia on Demand" (date unknown).
Tv. Tv. Product Brochure "Questions and Answers about broadband, the Internet and how content owners can take advantage of both right now" (date unknown).
Screen International "Digital dithering" (Oct. 20, 2000).
Orca Computers Ltd. Product Brochure "Right TV" (date unknown).
The Bulldog Group. Various Corporate Publications.
Television Business International pp. 19-25 "D-Exploitation" (Nov. 2000).
Video Store Magazine pp. 14-16 "Digital Cinema" (Apr. 2000).
iBEAM Broadcasting Corporation Product Brochure "iBEAM Syndication Manager" (2001).
GeoVideo Networks Various Corporate Publications (date unknown).
Reeplay.com Various Corporate Publications (date unknown).
Sightsound.com Product Brochure (date unknown).
Tivix Various Corporate Publications "Online Program Marketing for Buyers and Sellers" (Feb.-Jun. 2000).
TV Files Product Brochure "Enabling Convergence" (date unknown).
The Hollywood Reporter pp. 9-10 (Feb. 27, 2000).
Internet Studios Corporate Profile (date unknown).
Filmbazaar.com Product Brochure "Moving Pictures at AFM 2000" (date unknown).
Filmbazzar.com Product Brochure "Professional Business Center" (date unknown).
TIVIX Product Brochure "Streamlining" (date unknown).
AFMA Independent vol. 1, No. 4 "Internet Distribution of Films Presents Problems and Possibilities" (Nov./Dec. 1999).
TvResource.com Advertisement (date unknown).
Independent 2. "Welcome to the Electronic Future" (date unknown).
Screen Digest "Digital Cinema" Year Two Getting Down to Business (Apr. 2001).
EMAP Media Limited "Boeing Digital Cinema" (Jul. 22, 2001).

FilmSellers.Com

Select media type:

Feature film

☐ Digital
☐ Celluloid
☐ Magnetic Tape

Audio

☐ Digital
☐ Analog (Magnetic Tape)

Text and Graphics

☐ Digital
☐ 8.5 x 11
☐ Posters

Fig. 4

FilmSellers.Com

In order to process your request, we need you to give us some information on your credit.

Name:
Address:
City:
State:
Zip Code:
E-Mail Address:
Telephone:
Fax:

Credit Card Number:                              Type: ☐VISA    ☐Mastercard
Date of Expiration:
Bank:         Account No.:                       Branch:

MULTIMEDIA MARKETING AND DISTRIBUTION SYSTEM

This application is a continuation in part of U.S. patent application Ser. No. 09/840,283, filed Apr. 23, 2001, the disclosure of which is hereby incorporated herein by reference thereto.

BACKGROUND OF THE INVENTION

1. Field of the Invention

The present invention relates to the marketing and distribution of multimedia material, including digitally generated film, video, graphics and audio, and analogues traditional media converted into digital movie and television programs, and associated marketing materials for distribution over a computer network to exhibitors and broadcasters.

2. Description of Related Art Including Information Disclosed under 37 CFR 1.97 and 37 CFR 1.98

The explosive growth of computer networks, like the Internet, has provided a convenient way for computer users to obtain from remote sites information in the form of text, graphics and audio, as well as video. A computer connected to the Internet or other computer network can also be utilized to interact in real-time with other computers connected to the computer network.

The film and television industries have evolved over the years with the audiovisual image becoming omnipresent. Yet despite the incursion of the new technologies into many fields of business with the microchip and digital technology changing many aspects of modern life including marketing and distribution systems: the movie and television business remains largely unchanged still the motion picture and television industry today can benefit greatly by reducing overhead costs with the attendant improvement in profit margins. These overhead costs include the replication and distribution of hundreds of celluloid prints, of movies, videotapes, advertising materials and so forth.

Today, these costs remain substantially of the same character and nature as when the industry was relatively young because the sale of audiovisual materials has undergone little change in decades. Typically, distributors through film markets, catalogue sales and long established relationships between purchasers and sellers, sell films.

Another problem facing producers and distributors is the high cost of transportation and shipping of the films themselves and marketing and advertising materials associated therewith. Part of this problem includes delayed and damaged shipments adding to the costs involved. Another high-cost component involves responding to requests for previews, marketing materials, contract negotiations, and collecting and tracking sales data for royalties and further marketing programs. Finally, with regard to promotional materials, there is little opportunity to select the same, and wasteful production and transport often occurs.

Another problem addressed by the present invention is the time involved in marketing and distributing multimedia products, especially motion picture films. The longer the time taken to introduce and distribute a multimedia product the higher the financing costs become since revenues take longer to be returned.

Yet another problem with the present distribution system is that the producers and owners must market the products through several different channels requiring similar expenditures in each of those market areas. Each purchase usually involves multiple charges for each item sent, such as trailers, sample materials, duplicates and masters. These costs, especially when incurred across continents can double a buyer's cost, thereby significantly cutting into operating margins. In addition, obtaining prospective purchaser lists, and the purchase history of those purchasers, in locations around the globe is difficult and thus very costly.

Many elements are generated during the production of a typical feature film. The storage, handling and administration of these elements are time consuming, labor intensive and thus costly. The delivery process necessitates working with a variety of suppliers to successfully assemble the required elements, including thirty five millimeter release prints, audio and music tracks, foreign language tracks and transcripts, still pictures, video masters in a variety of formats, such as NTSC, PAL, Beta, one inch, D1 and D2. Scripts, legal documents and a variety of other documents must be stored and shipped. Multiple versions of films are often required to comply with foreign rating regulations. Each time a new purchase is made for a new market the process must be repeated. The elimination of physically handling all of these elements significantly reduces labor costs. Therefore, the present invention is designed to reduce or nearly eliminate such handling.

The market for many films is now worldwide, yet communication between smaller markets around the world remains challenging. Many movies continue to produce revenue long after their first release by being re-released in these smaller markets. In addition, television programming for major markets can continue producing revenue when local television stations around the world seek programming. Nevertheless, servicing the smallest markets remains grossly inefficient. The problems and costs associated with marketing and distributing to these markets are currently not cost effective. The present invention addresses and minimizes these problems by substantially reducing the costs making the marketing and distribution of movies and television programming to these markets economically feasible.

BRIEF SUMMARY OF THE INVENTION

The inventive method of marketing and distributing multimedia such as motion picture films, television programming and the like comprises receiving multimedia material from a producer or owner of the material. If necessary, the material is converted to digital format. The digital material is then stored on a computer readable storage medium. A server system is provided that is accessible over a communication network. The server system accesses data from the computer readable storage medium for transfer over the communication network to exhibitors. The server can provide samples of the multimedia material to potential purchasers depending upon the marketing strategy employed by the producer or owner.

The inventive system provides for the download, upon request, from the server system over a public or private network of multimedia material and then advertising material to exhibitors purchasing rights over the inventive communications network. This allows exhibitors and broadcasters to locally use the multimedia material.

The method of marketing and distributing multimedia is dependant upon the format in which the media is embodied. One method of receiving multimedia material is by downloading via the communication network. If the media is not in an electronic format, the producer or owner must convert the media to such a format or physically transport the media to the server for conversion to an electronic format. The preceding arrangement is employed in accordance with the invention for motion picture movies that are commonly produced only in a film format, or in a lower quality on magnetic videotape. The inventive method of marketing and distributing multimedia also includes the capacity to digitize any non-digital media for storage on the computer readable storage medium.

The inventive system may be employed to deliver films, advertising, coming attraction strips, etc. In conventional form, the inventive method of marketing and distributing multimedia includes the option of providing a server system accessible over a public communication system, such as the Internet. The distribution of the multimedia includes downloading digital material from the server system for digital display to an audience.

In addition to the base media, advertising materials can be downloaded from the server system.

In addition to providing multimedia to users, the server system collects data about the users and information respecting the economics and sales success of exhibitors and broadcasters.

BRIEF DESCRIPTION OF THE SEVERAL VIEWS OF THE DRAWING

These and other features and advantages of the present invention will be readily apparent from the following detailed description of the invention, the scope of the invention being set out in the appended claims. The detailed description will be better understood in conjunction with the accompanying drawings, wherein like reference characters represent like elements throughout the various views of the drawings and wherein:

FIG. 4 is a web page screen for the selection of material;

FIG. 6 is an illustration of a secondary web page for the entry of financial data in a web site constructed in accordance with present invention;

DETAILED DESCRIPTION OF THE INVENTION

Figure 1:
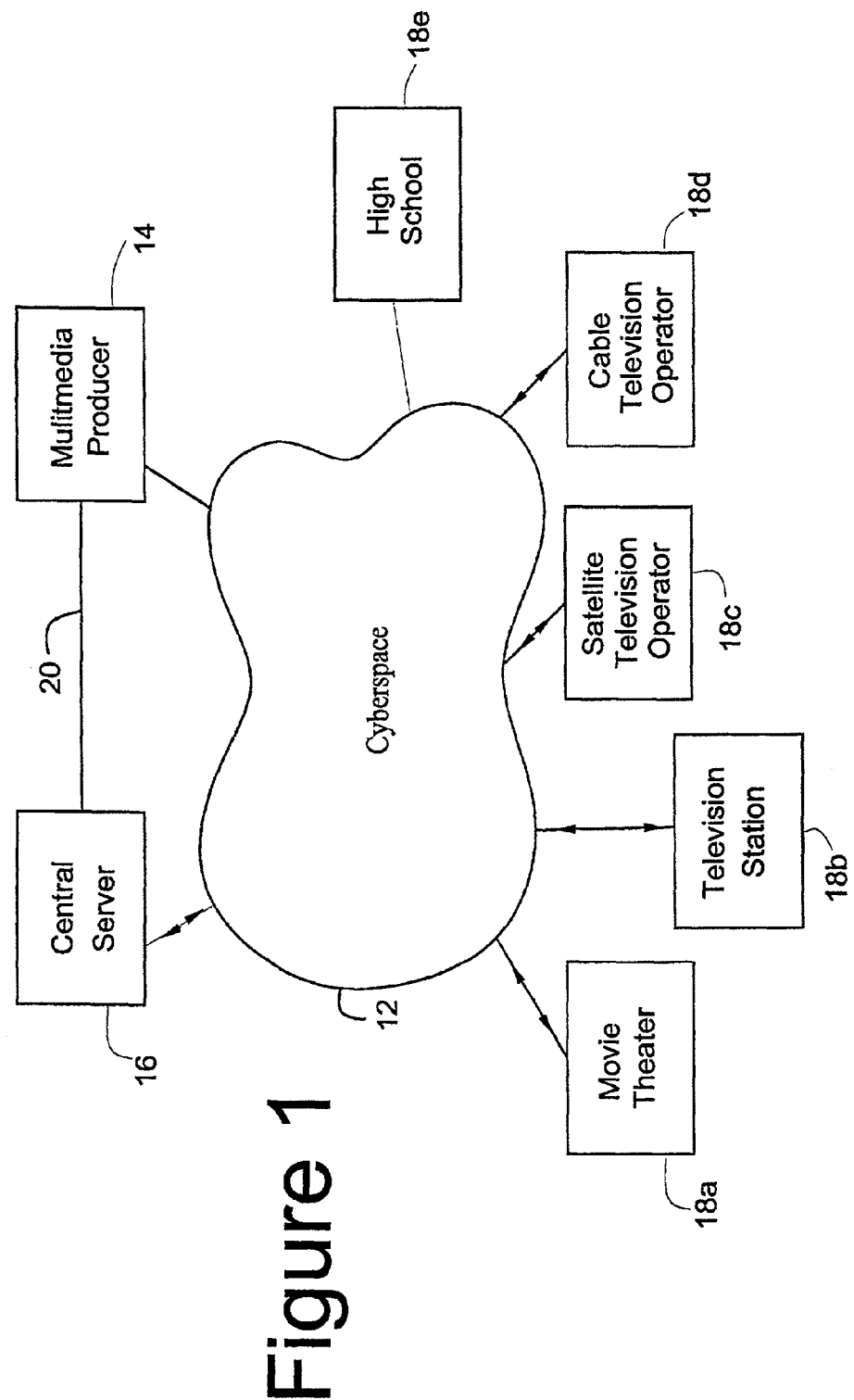
FIG. 1 is a block diagram generally illustrating the inventive system for marketing and distributing multimedia products.

Referring now to FIG. 1, a computer or communications network 10 implementing the method of the present invention is illustrated. In the illustrated embodiment, the system exchanges information through the use of cyberspace 12, which may be either a private computer-based communications system or a public system, such as that known under the alleged trademark the Internet. In accordance with the invention, an owner of rights in a particular work, such as a multimedia producer 14, is linked through network 10 to a central server 16 which functions as a distribution web site in accordance with the invention. Multimedia producer 14 may also be connected to central server 16 via a private network link 20, thus providing either a faster data link, a more secure link, or both. In addition, in accordance with the invention, it is contemplated that communications between the owners of rights may also take traditional forms, such as the transfer of print masters, or the like.

Similarly, a plurality of exhibitors, including a movie theater 18a, a television station 18b, a satellite television operator 18c, a cable television operator 18d and a high school 18e, are also connected through cyberspace 12 to central server 16. It is noted that in accordance with the invention, the servicing of smaller facilities, such as high school 18e is particularly cost-effective as compared to conventional methods for transporting film and associated promotional materials.

Multimedia producer 14, central server 16, and each of the exhibitors 18a-e obtain and/or send product and associated information through facilities which comprise computers with various peripheral devices, such as a communications modem, display screen, keyboard, various printers, scanners, and the like, as will be discussed in greater detail below. In the case of central server 16, relatively robust commercial systems may be employed. However, sufficient functionality can be achieved by exhibitors 18a-e using high-end personal computers with enhanced RAM and hard drives.

Figure 2:
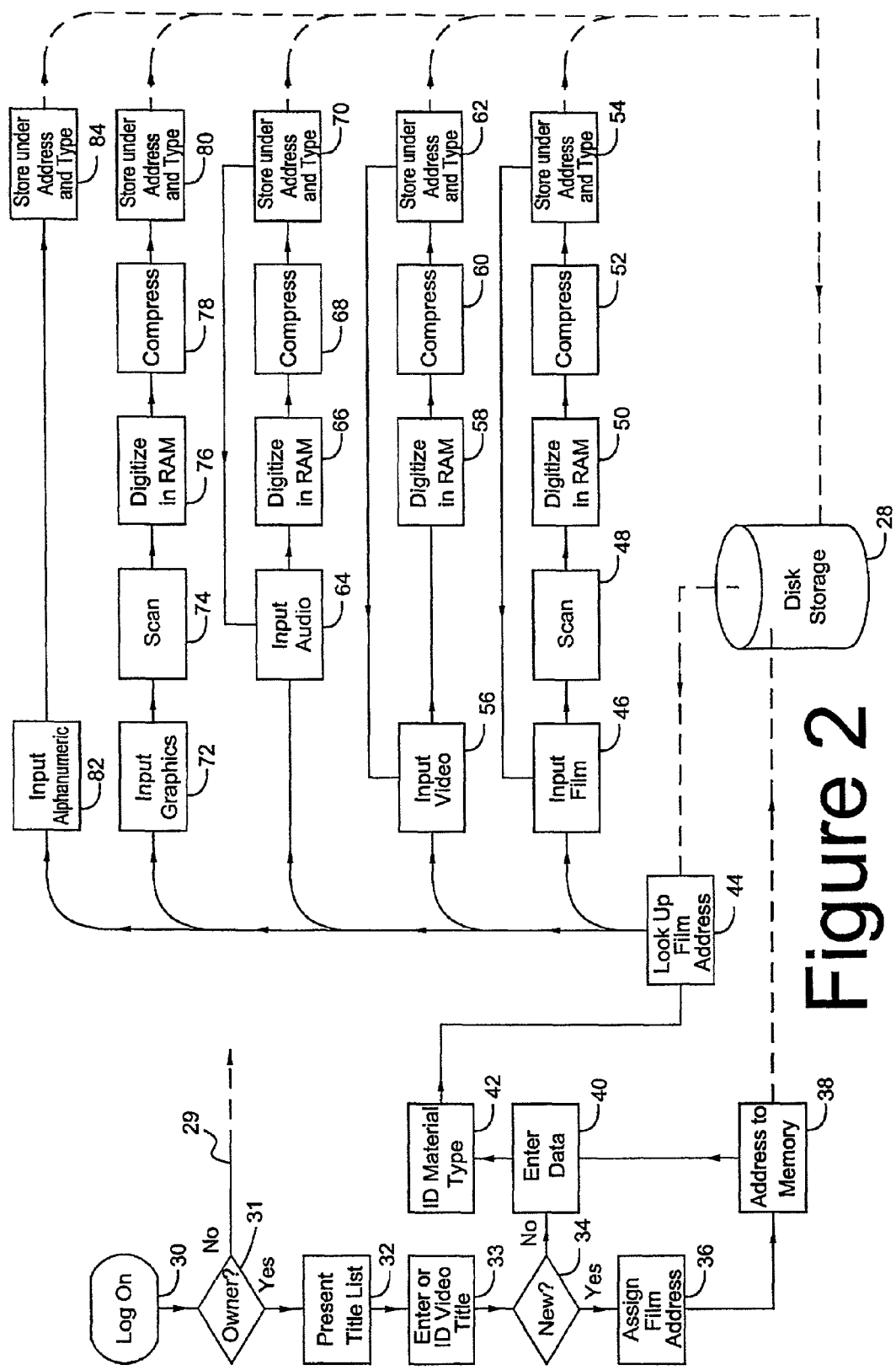
FIG. 2 is a block diagram showing a method for loading multimedia of various formats on a computer readable storage medium in accordance with the invention.

Referring now to FIG. 2, a flow chart is presented that generally shows how various multimedia formats can be loaded into a computer readable storage media 28 by producers and other persons who own rights in various cinematographic properties. In accordance with the invention the same are loaded into a computer readable storage media 28, which is located at central server 16. Media 28 may take any one of a number of different forms, but in accordance with the preferred embodiment comprises a hard drive with high-speed access and large capacity. Alternatively, the same may be a combination of a large hard drive for materials other than feature-length or program-length movies, while such movies and programs are made available via a jukebox arrangement involving access to multiple disks and mechanical systems for moving those disks to one or a plurality of player heads.

In accordance with present invention, there are a plurality of input paths over which films and associated materials can be transported for storage in media 28. In the simplest case, all such media material is physically delivered to central server 16. An operator at central server 16 logs onto a central processor unit located at the premises of the website operator at step 30 in FIG. 2. After logging on, the operator of the system inputs an identifier, such as a title of a movie, associated with the material to be entered, converted, and stored on storage media 28. Such material associated with the title may include the actual film, in the case of a feature length film, graphics for a newspaper advertisement, a radio spot, a poster, a coming attractions film segment, handbills or the like.

In accordance with the invention, it is also contemplated that producers may log onto the website from a remote location. Likewise, the official operator of the website can also log onto the system from a remote location.

Input of Materials into the System

If we first consider the case of a remote official operator logging onto the system at step 30, such operator gives his name and password, thus identifying himself. The system thus knows the identity of the person using the system from the name and password of the individual logging onto the system, in this case the official operator. The official operator is treated as the equivalent of an owner because he acts for owners to input materials into the system. When the operator is identified, at step 31 the system makes the determination that the operator is acting for owners of product. At this point the system presents the operator with a list of titles at step 32 and gives the operator access to implement the system whose operation is illustrated in FIG. 2.

If, on the other hand the system determines that the person logging onto the system is an exhibitor, it proceeds along path 29 through the inventive method steps toward implementation of distribution of product over the Internet to the exhibitor, the charging of the account of the exhibitor, and to various other steps, as will be described in detail below.

One embodiment of the invention will now be described in connection with the input of a movie entitled "ABC". Initially, this movie is received on seventy-millimeter film (celluloid). The producer or owner of the movie also provides the operator of the inventive web site with advertising posters, newspaper advertisements, radio promotional spots on audiocassette or compact disc, television promotional spots on video cassette or videodisc, trailers on celluloid or video cassette, a film strip comprising a coming events announcement, and text, such as all or portions of the script and critic's reviews. All of these materials and other types of materials that are normally transported physically from the owner, such as the producer or other owner of rights, to the person licensing the movie, are digitized and stored in storage media 28 in accordance with the invention.

When these materials are in-house, the operator, who is to enter the material into the information storage media 28 for availability over the Internet from central server 16, enters the title, ABC, at step 32. In accordance with the invention, a screen for the entry of the title is provided. The screen has a line into which the title is to be entered which may be highlighted, whereby the title of the movie may be typed in. The system, in this respect behaves like other systems where the beginning of the typing of the name results in the system following the keystrokes to come to the title, if that title is in storage. In this respect, the system operates much like help topics in many programs. Likewise, it is possible to cursor through the list of titles, again as in the case of the help topics screen. If no material associated with the title is in storage, the title will not be found. It then becomes necessary that, in accordance with the invention, the title must be entered into the system at step 33.

In this respect, the central processor 22 at step 34 checks computer readable storage media 28 to see if the title has previously been entered into the system. If the title is already in the system, the operator will be given the opportunity to enter or select various versions of the media and select materials, such as a television version, director's cut, poster, European version and the like, as appears more fully below.

If it is a new title, the system, at step 36, assigns an identifier to the title ABC and, at step 38, stores that information in storage media 28. The operator can then input any additional data at step 40, such as the producer or owner of the title. The object of this additional entry of data is to allow the identification of products in ways other than the title.

This allows additional flexibility when it comes time to output product from the system. For example, if one wanted to search the work of Stanley Kubrick, or dramatizations of Mario Puzo novels, such additional information provides for this facility. In addition, more than one piece may have the same title. Accordingly, such additional information allows positive identification of the particular item to be furnished to an exhibitor or broadcaster. In accordance with the invention it is contemplated that after a title has been entered into the system and given an identifier, the title may be retrieved at step 33 from storage media 28 and presented to the operator at step 40, where additional materials can be added if desired.

Returning to description of the inventive method for inputting materials into the system, the operator indicates the type of media at step 42 that is to be converted into digital format, if necessary, and stored on storage media 28. For example, the material may be identified as a feature film on celluloid, an hour-long television program on video, a radio spot for a movie, the magazine advertisement for a television show, or the like. Once rendered and stored digitally on central server 16, audio and visual materials are easily accessible by business-to-business customers around the globe.

The invention may be applied, for example, to the various types of media illustrated in FIG. 2, namely celluloid, video, audio, text, and graphics. At step 46, visual media, such as film or videotape is input into the system for conversion. Movie film can come in several formats of its own, such as seventy millimeter, thirty-five millimeter, and sixteen millimeter, each of which can be in such formats as interpositive, duplicate negative, original negative, low contrast print, or release print.

In the case of such film inputs into the system, it is necessary for the film to be scanned at step 48 and turned into an analog RGB video signal. The video signal resulting from the scanning of the celluloid film can then be digitized using an analog to digital converter and stored in RAM at step 50. Because of the high bandwidth of the resulting video signals and the very large information content associated with a video signal, it has relatively large storage requirements. However, video signals are also highly redundant. Accordingly, compression of video signals is highly effective and desirable. Accordingly, after the signal has been digitized in RAM at step 50, the signal is compressed at step 52, given an address at step 54 and stored in media 28. At step 54, the type of the particular product, which has been stored, will be indicated in storage, in this case, film, and details respecting the nature of that film will also be indicated in storage. For example, the product may be designated as seventy millimeter, feature length, documentary footage shot for television in 1984. Other details respecting the particular product, such as the producer, director, actors cover and other information may also be sent to storage for later retrieval.

In accordance with the present invention, in order to avoid a need for excessive storage space in media 28, the video signal, whether it was generated by scanning conventional celluloid film or originated as a video signal on videotape, is not put into RAM for compression in one large operation, but is, instead, digitally compressed portion by portion to reduce bandwidth and file size, and then stored at step 54. However, after one video portion has been stored in media 28 at step 54, the system returns to step 46, where additional video is input into the system and processed as described above, and the entire process repeated until the entire video has been transformed into RAM. It is noted that the redundancy in a video signal resides largely in corresponding pixel to corresponding pixel redundancy from one frame to the next. Accordingly, it is highly desirable that portions to be compressed be more than one frame in size, and that each frame of each such portion is compared to the prior frame, corresponding pixel by corresponding pixel. This will effectively remove redundancy and maximize the reduction of file size.

In accordance with the invention, it is also contemplated that electronic video recordings may also be input into the system, digitized and stored in media 28. For example, possible video formats include VHS, 1.sup.2, digital Betacam, D1, D2, BetacamSP, and the new high-resolution formats. When a video signal is to be digitized, scanning is not necessary and after input of the footage at step 56, the system proceeds directly to digitize the signal and store it in RAM at step 58. The digitized movie is then compressed at step 60, and stored in RAM together with its associated other information, as described above the connection with film input at step 46, under its identifier address at step 62 in computer readable storage 28. Here again, because of the high information content of video, digitizing and compression is done in portions at steps 58 and 60, the information is stored at step 62, and the system proceeds back to step 56 to repeat the process for the next portion of input video.

As alluded to above, the objective of the system is to store not only feature films, but also associated promotional and other materials. For example, marketing materials may be stored along with a feature film. This allows such materials to be sent in digital form directly from producer 14 to central server 16 via either cyberspace 12 or private link 20, as shown in FIG. 1. With the advent of motion pictures being "filmed" digitally, this transfer will be relatively easy. However, since almost all existing feature films are on celluloid, they must be converted by scanning and digitizing, and then compressed and stored, or converted and compressed through the use of equivalent techniques.

Referring back to the objective of storing associated materials, if, for example, a radio spot is to be input into the system, the system proceeds to step 64, where audio material can be entered. This is done by the system activating a soundcard or similar device in the computer associated with the storage of information on disk storage 28. In accordance with the invention, analog audio may simply be coupled to the soundcard. The same can be generated using any playback device, or, alternatively, or may arrive from a remote location by wire, for example, over the telephone system. Audio may input into the system by a producer 14 in any format such as DA-88, DAT, thirty-five millimeter magnetic tape, sixteen millimeter magnetic tape, 1/4.sup.2 audio tape, thirty-five millimeter optical tack, computer session, compact disc, audio from video formats noted above, or any other source, including live performance. If audio is input at step 64 in an analog format, it is converted to digital at analog/digital conversion step 58. Digital audio may then optionally be compressed in memory at step 68. The audio spot is then stored at step seventy under a selected identifier which associates it was the particular feature film or other product for later retrieval from readable storage 28 via the Internet, private link, or the like.

It is also contemplated that the inventive system will be used to make graphics, such as movie posters, handbills, newspaper advertisements, and the like inexpensively and quickly available at remote locations. In the event that the operator wishes to input such materials into the system, the system proceeds to step 72 in response to the selection of the media type at step 42. The operator activates the input graphics at step 72, after the system activates a scanner at step 74.

In accordance with the invention, it is contemplated that the input of graphics at step 72 and scanning at step 74 will consist generally letter size or smaller graphics and text (typical of magazines and smaller newspaper advertising, handbills and the like). Over the system also contemplates application to oversize graphics with and without text (such as posters of the type commonly seen at movie theaters). After the performance of scanning at step 74, the output of the scanner is digitized at step 76. The file containing the graphics entered into the system is then compressed at step 78, although this is optional. The final version of the material is then stored in memory at step 80. Such storage at step 80 in disk storage 28 is done under the selected identifier that associates it with the particular feature film or to like. Such storage also includes the description of the media type (graphics) so that the same is available from storage media 28.

There has been described above a process for moving graphics of a conventional nature into the system. This is particularly important in the case of the overwhelming majority of existing feature films and other productions. However, this will become increasingly unimportant in the future as virtually all production of such materials migrates into the digital world.

Accordingly, as multimedia producer 14 in digital form may produce some or all of the media materials in this category, this material may also be transferred electronically over cyberspace 12 or private network 20 to central server 16. Downloads to central server 16 may be done directly into storage media 28 under a selected identifier. Alternatively, more control may be exercised by the operator of the web site at central server 16 by having the download stored temporarily in a "mail box" file assigned to the producer for such purposes, or the like, until an operator located at the central server reviews material and transfers it to its proper place in storage media 28 under its associated feature film or the like identifier and type.

In similar fashion, and it is possible, in accordance with the present invention, to input alphanumeric materials into the system for retrieval over the Internet. Such alphanumeric materials may include scripts, foreign subtitles, and closed caption data for the hearing-impaired. Where such alphanumeric data has been selected for input at step 42, the system proceeds to look up the film's identification address, which is then associated with the material at step 44. The system then receives such alphanumeric data at step 82, and stores that material at step 84.

Inasmuch as such alphanumeric material is generally available in digital form, it is contemplated that the same will be downloaded to disk storage 28 through the use of the Internet or conventional magnetic disk storage, such as floppy disks, or the like. However, in the event that such information is only available in hardcopy, the same may be scanned using optical character recognition software, with an OCR reader and the optical character recognition software being activated at step 42 upon the identification of the type of material.

In accordance with the invention, it is also contemplated that other materials not specifically identified above, may also be input into the system for later retrieval from disk storage 28 via the Internet or other means. It is also noted that, in accordance with the invention, it is preferred that material be input into the system through the use of existing digital materials, through the use of remote transport over the Internet or other communications network.

In accordance with the method of the present invention, the presentation of the program illustrated by the flowchart of FIG. 2 is done on the monitor of a computer in conjunction with the number of screens which form the graphical user interface between the inventive system and the person implementing the storage of film and materials in disk storage 28. More particularly, FIG. 3 is an example of a display screen for implementation of steps 30 and 32 in FIG. 2.

Graphical User Interface

Figure 3:
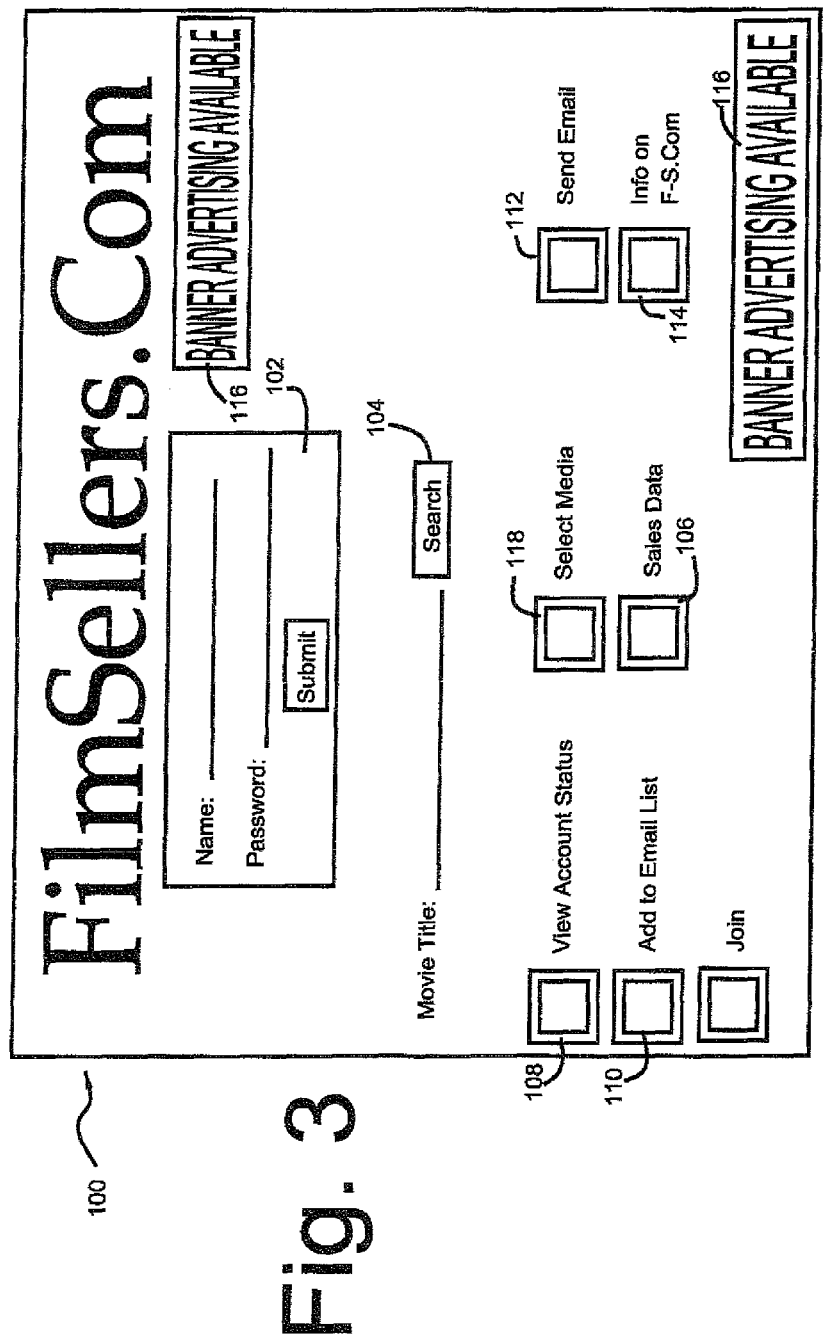
FIG. 3 is an illustration of a computer screen suitable for serving as a home page in accordance with the method and apparatus of the present invention.

Referring now to FIG. 3, a screen 100 is shown that is a simplified web site home page to be viewed by a producer or an exhibitor looking to transact business or communicate with the operator of the inventive web site. A log-on block 102 for implementation of step 30 is provided. A person working on behalf of any owner of rights which participates in the system (such as a producer 14 as illustrated FIG. 1) or any one of the exhibitors 18*a-e* can enter his organization's name and password in order to gain access to the rest of the web site. If a valid password is entered the user can then make a selection or enter a desired title. Once logged on, a user can enter a title or click on search button 104 to locate a particular type of movie.

Searching is done by way of a secondary group of screens allowing searching according to any of various search criteria, such as producer, director, lead actor, supporting actors, subject matter, etc. Once the searching has been completed, the title of the product, which the user is interested in obtaining, appears after "Movie Title:" in screen 100.

Screen 100 has two sets of functions associated with it. The first set of functions is implemented when the system recognizes that it is dealing with a producer or other order of rights. On the other hand, a second set of functions is active and implemented when the system recognizes that it is dealing with an exhibitor.

In the case where the system recognizes the person logging onto the web site as an owner of rights, it implements the first set of functions. Accordingly, if the user is a producer or other owner of rights and wishes to view the conditions for use of the web site to distribute his product for various types of products, he clicks on an enter sales data button 106. Upon the clicking of button 106, if the user is unknown to the system, the user is instructed in subsequent screens to enter such data as the type of product which he licenses, the performers associated with the product, the content (i.e. dramatic, musical, news, etc.), and historical income data. If the user is already known to the system, much information is already known to the system, such as the location of the exhibitor, the nature of his business, his existing contractual relationships with exhibitors and with the operator of the web site, and the like. This allows the system to give the exhibitor cost factors in accordance with his contracts and other information. Naturally, these figures are a function of agreements between the web site operator and the owner of rights.

In addition to using the home page 100 as an entry point to subsequent screens for providing information, and providing for the input of product into the system, the home page also provides a portal for a client, such as an exhibitor or an owner of rights, to view his account status, as will be described more fully below.

In addition, an exhibitor, for example, may click on an email button 110 to be added to an email list to receive announcements for such things as newly added titles on a regular basis. In the case of owners of rights, other subject matter will be implemented in regular e-mail communication. In addition, a "send e-mail" button 112 may be provided on home page 100 to allow messages to be sent to the web site operator.

A button 114 for requesting additional information about the web site may also be placed on the home page illustrated in FIG. 3. This information may be on the home page to give unregistered visitors an idea of what the web site is all about. Clicking on button 114 will bring the users to a secondary page or pages giving information on the web site (not illustrated).

It is also contemplated that various advertisements 116 may also appear on the home page. In accordance of the invention it is contemplated that such advertisements will be specific to particular users, their geography and the like and will be based on information held in the system with respect to prior exhibition of various titles, their popularity and the like. The objective of the system is to use data inside the database of the web site to predict successful products and to make such products available to users by way of advertisements, and to further include in said advertisements information with respect to the fact that such product is expected to be successful and why such success is to be expected. Such information may include information on previous box office, Nielsen ratings, or the like in other cities.

Such information may also include the fact that the product is generally popular, but has not been seen in the area for years. This is of particular interest to television operators who are sometimes not well staffed and thus not able to do the research, which would make their stations successful. As is alluded to above, it is the objective of this invention to store in its database all information respecting licensing of films and other products, their location, the time at which licensing of the same occurred, box office, and so forth for later use in targeted advertising and in checking the accuracy of reported box office (in order to prevent fraud), and for other uses known to those in the industry.

Returning to the description of the function of screen 100 as a portal for exhibitors or the official web site operator to enter products into storage media 28, once the title is entered data entry logon block 102 and button 118 is click on, the system proceeds to screen 120 in FIG. 4. Screen 120 provides for the input of three types of material, namely, text and graphics, they feature film, and audio. The user would then click the button associated with the particular type of material in the general categories noted above, which he wishes to input. Each selection may have sub-screens for making additional distinctions between the formats set forth above.

Alternatively, screen 120 could be replaced by a screen, which lists such things as feature films, television specials, news programs, and so forth. Selection of one of these types of material to be downloaded to the web site results in the generation of inappropriate sub screen. For example, if feature film is selected, the sub screen would list feature film, radio promotion spot, magazine advertisements, posters and the like. Some screens coming off of each of these selections would differentiate between the various types of formats. For example, feature film would bring up a screen showing celluloid format, video format, and digital format.

Either of these two alternatives provides for the generation of descriptive and indexing information in the process of downloading product into the web site.

In the event that the decision has been made to make certain functions of central server 16 directly available to producers 14 over a computer network 10, screen 44 becomes a generally available web page and functions for numerous producers 16 as it does for an operator at central server 16 to enter new multimedia material, such as a new version for a movie, or simply to update a critics comments on a poster or press release. Even different departments with an individual producer 16 may have access to such a web site of central server 16.

Remote Access to Product and Transfer of Same over the Internet

If the user is an exhibitor and wishes to view the conditions for sale of the particular product selected, the exhibitor clicks on an enter sales data button 106 in FIG. 3. Upon the clicking of button 106, the user is instructed in subsequent screens to enter such data as his expected box office figures. Other information is already known to the system, such as the location of the exhibitor, the nature of his business, his existing contractual relationships with producers or owners and with the operator of the web site, and the like. This allows the system to give the exhibitor cost factors in accordance with his contracts and other information. Naturally, these figures are a function of agreements between the web site operator and the owner of rights in the particular title sought by the user.

In addition to using the home page 100 as an entry point to subsequent screens for searching and purchasing rights in product and arranging for the transport of the same via the Internet or otherwise, including conventional means, the home page also provides a portal for an exhibitor as well as an owner of rights, to view his account status.

If the exhibitor wishes to obtain media, the exhibitor clicks on button 118, and this brings up screen 120 illustrated in FIG. 4. As illustrated in FIG. 4, the select media type screen 120 presents the operator with several choices with respect to media type and format. The exhibitor is thus invited to click on various buttons to obtain various products. It is noted that this screen is greatly simplified or purposes of illustration and may include any products that the operator of the web site wishes to make available, such as posters, radio advertisements, and so forth, and that screen 120 may have specific entries of it which show the availability of such products, their length, their size, and so forth.

Figure 5:
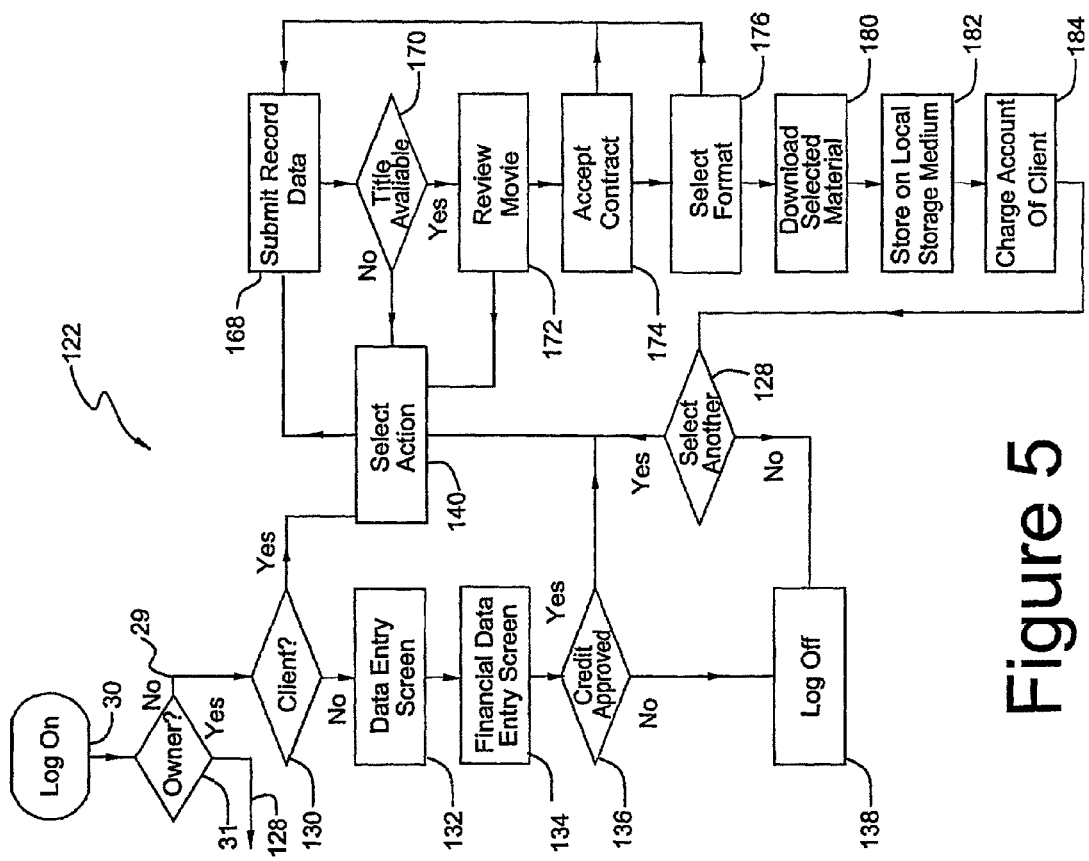
FIG. 5 is a flow chart illustrating the inventive method for obtaining product over the Internet.

Once a title and its associated marketing material has been stored on computer readable storage media 28 of central server 16 as described above, it can be accessed by an exhibitor 18a-18d from anywhere in the world through a connection to cyberspace 12, in this example, the Internet. The steps of inventive method 122 for implementing the transport of product already in storage at the central server are illustrated in FIG. 5.

In particular, an exhibitor 18, after reaching the central server's web site, can log on at step 30 by entering a name known to the system and confirming the same with a password. This is done on the site's home page as illustrated FIG. 3. Alternatively, the exhibitor may click on a become a member button 124 and be sent to a data entry step 98. Such a data entry step is associated with a screen with basic information about interests and the nature of the user. Later, the system sends the visitor to a financial data entry screen 126, as illustrated FIG. 6, and as will be more fully described below. In accordance with the invention, it is anticipated that the ability of small facilities, such as high schools, colleges and the like to obtain first quality product will be enhanced. This is because of the cost savings associated with the automated transfer of product over the Internet. Accordingly, such users will be paying relatively small amounts of money and a credit card financing arrangement may become the rule rather than the exception. Such an arrangement is easily implemented using screen 126.

However, in the case of "trade" users, more sophisticated arrangements may become necessary with correspondingly different input screens. Such arrangements may involve automatic debiting of bank accounts, 30 days credit, or other arrangements typically used in the entertainment industry. It is also contemplated that charges may be key to Nielsen ratings in the case of television exhibitors, and that the output of the Nielsen ratings system may be input into the system for automatic charging of the accounts of television exhibitors after a particular product has been transported to the exhibitor and exhibited on television, provided that the Nielsen system has monitored the subject exhibition.

Referring back to FIG. 5, central server 16 examines the log on entry at step 31 to determine whether the individual is an exhibitor who is going to transport material to the database, or an exhibitor who Will have product downloaded to his site for exhibition, posting, advertising for the like. If the system determines that the individual is an owner or other person wishing to download information into the web site at step 31, it will proceed along path 128 and through the method steps illustrated in FIG. 2.

If, on the other hand, the system detects at step 31 that the person who has logged on is an exhibitor 18, it implements the method steps illustrated FIG. 5. In particular, it moves along path 29 to step 130, where it determines whether the user is already signed as a subscriber to the product transport service provided by the operator of the inventive web site. In the event that the individual is not a subscriber, certain limited functions will be allowed to function. The purpose of this is to interest the individual visiting the web site into becoming a member of the service.

Referring back to FIG. 5, if the user does not have a valid password, or is a new user, the user can enter and sign-up by giving certain data at step 132. After the data entry screen has been populated with all necessary data by the person visiting the web site, the system proceeds to step 134 where a financial data information screen 126, as illustrated FIG. 6, is presented to enable the visitor to enter either credit card and/or financial institution information.

It is contemplated that many different types of transactions will be available. For example, a user does not purchase a major motion picture with a credit card, since payment is usually based on revenues, such as a royalty payment, often keyed to box office receipts. However, a credit card makes sense for the purchase of a poster, radio spot, or the like. Older films and "B" movies may be available to some users, such as schools, libraries, and other non-profit organizations, and these may be purchased by use of a credit card. Indeed, even feature films being distributed to a relatively small venue for a single showing, such as a high school, they use the services of a credit card company. It is also noted that if the credit card is being used in connection with an exhibition at a small venue and the product is being offered on the basis of the box office as opposed to a fixed fee, an estimate of the charge associated with the transaction may be made in charge to the credit card account, with any excess being credited or shortfall charged after exhibition.

Alternatively, users may make deposits and obtain credits, which may be charged against, in the case of greater charges. It is also contemplated in accordance with the present invention that direct charges against the bank account of an exhibitor may be made, and that the same may be implemented electronically at the time that the order for, for example, a feature films is placed. Once the order has been placed and the account debited instantly and electronically, product may be delivered to the exhibitor. In the case of exhibition by license keyed to the box office, historical data in the system may be used to estimate the box office and the royalty.

After user 18 completes the entry of financial data at step 134, the system proceeds to a credit approval step 136. In the case of a credit card, this is simply the verification that the account has the amount of money needed to consummate the transaction. In the case of more substantial accounts, such as a theater in a major city, the system may log itself off after receiving data necessary for credit check, and the credit check implemented in a conventional way.

After the credit check has resulted in a determination, the system sends the user an e-mail telling him to contact the web site. The user then logs onto the web site and continues the process. If the credit of the user has been disapproved, he is told us at step 136 and the system proceeds to log off at step 138.

After the credit of the user, now a prospective exhibitor has been approved at step 136, the system proceeds to the select action step 140. Likewise, in the system had determined at step 130 that the individual was already an exhibitor known to the system after checking the name and password, the system also proceeds to the select action step 140.

Figure 7:
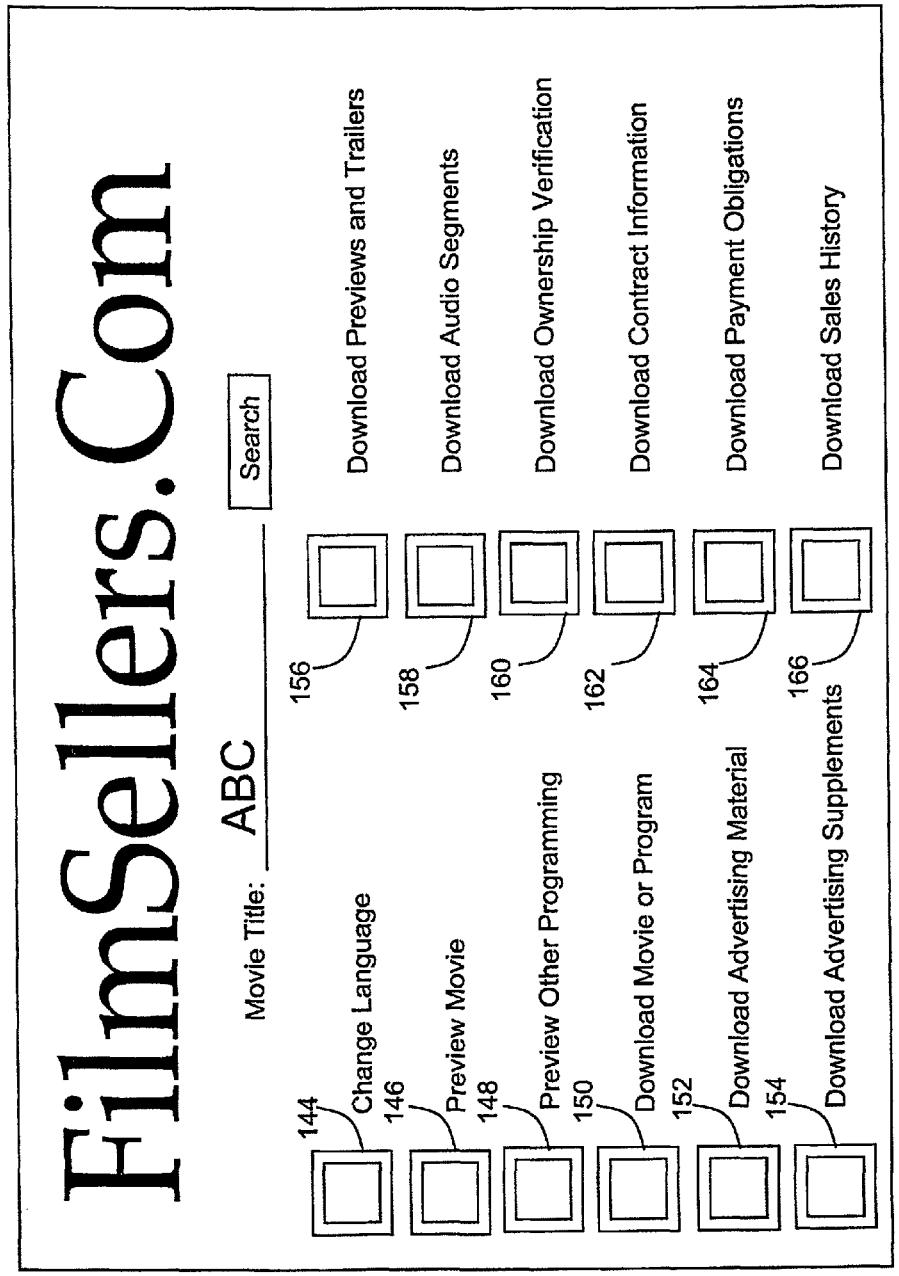
FIG. 7 is an illustration of a web page for selecting download of various products.

At the select action step, a select action menu is presented to the exhibitor in the form of a select action screen 142 which gives the exhibitor the opportunity to take various actions with respect to the title previously selected, as illustrated FIG. 7. An example of such a secondary web page 142 shows the various choices that a verified user may make. By way of example, and not by way of limitation, a user may click on a change language button 144 to view the web site in a different language. A user may click on a preview movie button 146 to preview a selected movie title or click on a preview other programming button 148 to view television programming or the like. A user may click on a download movie or program button 150 to download a selected title or program. A download advertising button 152 may be provided that either downloads an advertising package containing preselected material or allows the user to select from a list of available material. Since there may be advertising supplements available a download advertising supplements button 154 may be present. Other marketing materials that may be made available for the title selected in the previous screen, and having their own buttons in screen 142, may include previews and trailers button 156, audio segments button 158, ownership verification button 160, contract information button 162, a terms button 164, and a sales history and related information button 166, all for the previously selected feature film, program or other product.

After the selection is made at step 140, that selection is recorded at step 168 along with an identification designation associated with the exhibitor who has made that selection. This enables a record to be kept of each user's requests, along with selected data such as date and time of request. It also enables the collection of some of the statistical data to be used by the system.

If at the select action step a selection was made which indicates that the user is interested in exhibiting a particular product, such as buttons 146, 150, 152, or 166, the system proceeds to step 170. A title availability function is performed at step 170 to determine whether the particular title is available. If the title is not available, the screen receives and presents an indication that the title is not available and provides a button for the user to make another selection. If the title is not available, the exhibitor is returned to select action step 140 to select another action, or change the title, either manually or through activation of the search button in screen 142 illustrated in FIG. 7.

Once a title that is in the system has been selected its identifier is noted in memory and the exhibitor is able then to make appropriate selections. Several functions may be available on a single screen as described above. A user may call up a review movie function at step 172. At step 172 the exhibitor is given the opportunity to either review an entire movie or portions thereof. After that, the exhibitor has the opportunity to decide whether to select another title and be sent to select action step 140 or decide to proceed with purchasing or leasing the movie.

Where the exhibitor has decided to purchase the product after being presented with an alphanumeric invitation to do so, screen at the web site, the exhibitor is then presented with a contract for the particular material for the selected title and accepts or refuses the contract at contract acceptance function 174. User 18 then selects type of material that is desired at the select format step 176. For example, if a poster is desired, the resolution must be selected to fit the size that the poster will be, for example, handbill-size, or marquee-size. This selection is also recorded at step 168 for later analysis. The selected material is then downloaded at step 180 and the download is stored on the user's local storage media at step 182. Step 180 is implemented in a separate screen illustrated in FIG. 8, which will be described in detail below. The exhibitor's account or credit card is charged at 184. The user is then permitted to either select another title or leave the web site at step 128.

Figure 8:
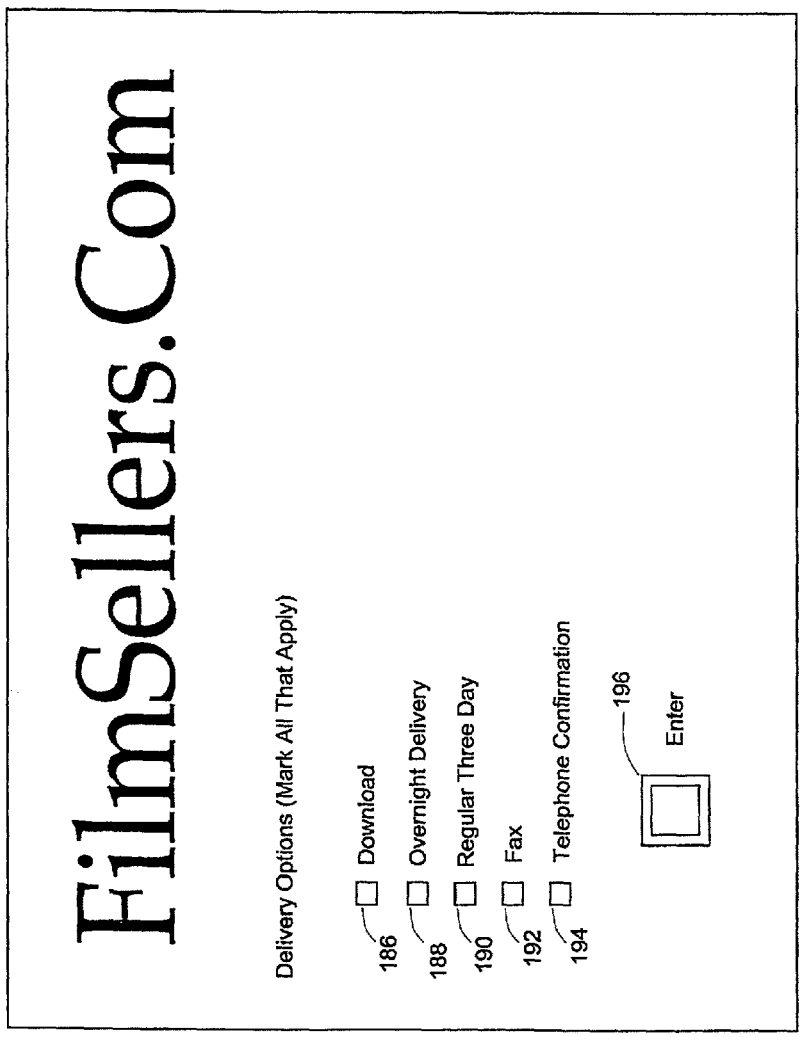
FIG. 8 is an illustration of a web page for selecting delivery options for multimedia material selected in accordance with the present invention.
Figure 9:
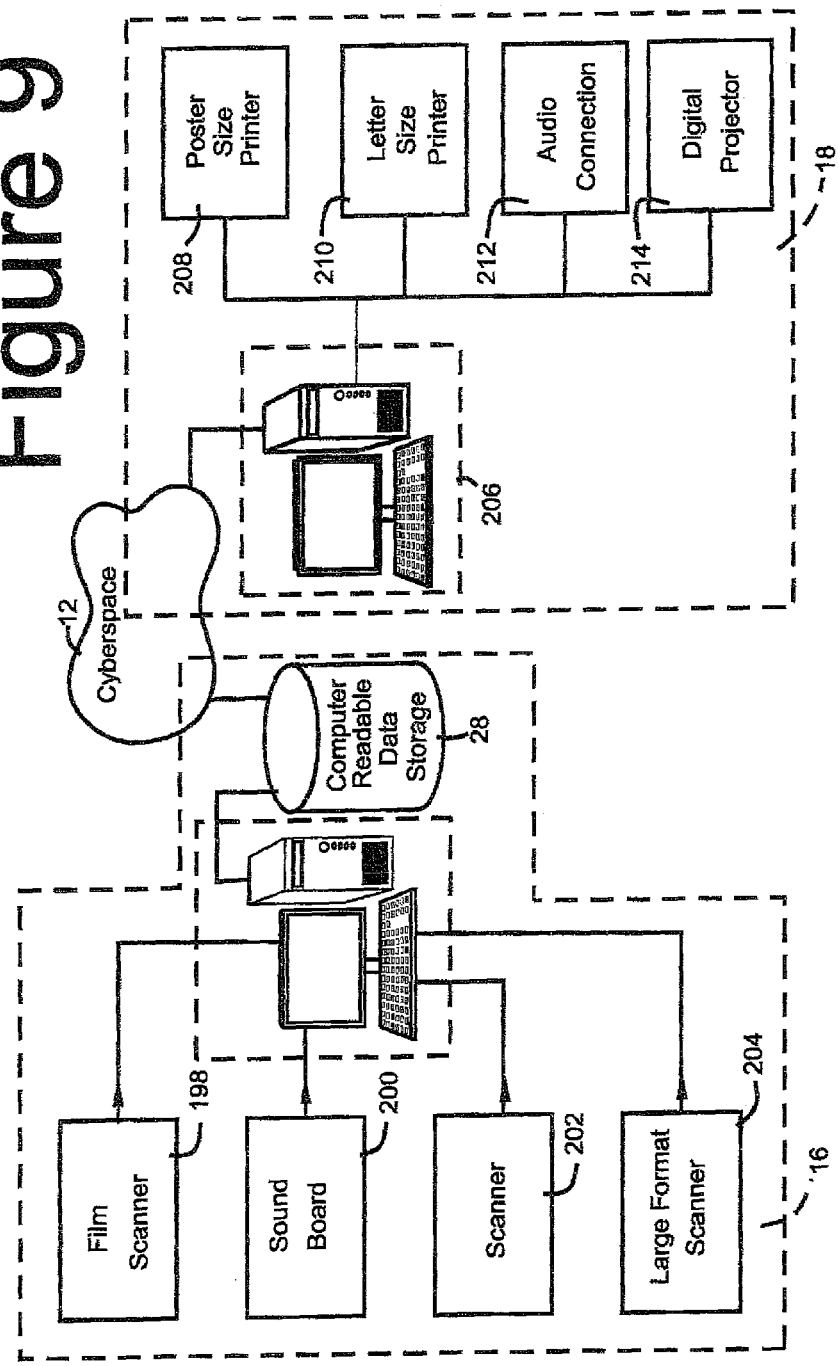
FIG. 9 is a block diagram showing the structure of input and output systems at the central server and at an exhibitor's facility utilizing a communications link which may be a publicly accessible network such as the Internet.

As alluded to above, FIG. 8 illustrates a web site page for enabling an exhibitor to select delivery options including download (via Internet) indicated by a selector box 186, overnight delivery indicated by a selector box 188, regular surface indicated by a selector box 190, fax indicated by a selector box 192 (if appropriate media requested), and a telephone confirmation of request option indicated by a selector box 194. The exhibitor clicks on any one of the above selector boxes 186 through 192, and, if desired, telephone confirmation selector box 194 executing their marked request(s) by clicking on send request button 180. After the appropriate boxes have been selected by the exhibitor, the exhibitor then clicks on button 196 to send this information to the system. Referring now to FIG. 9, the relationship between central server 16 and exhibitor 18 is shown in greater detail in block diagram form along with certain functions occurring at each location. As previously discussed, media having different formats is loaded or stored onto computer readable data storage media 28 using peripherals connected to central server 16. Examples of peripheral equipment include film scanner 198, which scans visual material in the form of celluloid film to be digitized and turns it into a digital signal, which is compressed, and stored on data storage media 28. Sound board 200 is utilized in conjunction with devices capable of playing audio material in various formats as discussed above to digitize the material for later compression and storage on data storage media 28. Scanner 202 is a letter size scanner for digitizing text, small graphical material and the like of marketing materials, such as newspaper and radio advertisements to be used by a local theater or television station owner. A large format scanner 204 is used to digitize media such as the posters that are common in theaters for hyping patrons with respect to coming attractions.

The computer readable data storage media 28 is made available to exhibitors 18 using their own central processor units 206 and its associated memory, communicating with the central server 16 over a communication network such as the Internet. In the case of using the Internet for a connection, user's computer 206 acts through the web site computer, which serves as the central server 16, to access data storage media 28. Once digitized media materials may be downloaded to user's computer 206 using an appropriate data storage media depending upon the size of the media to be downloaded. In particular, any selected material can be printed out on a poster size printer doorway, printed on a letter size printer 210, recorded on an audio connection or system 212, or a digital projector 214 in the case of a theater. However, in the case of a television transmitter associated with a television station, the material may be downloaded to videotape or any other format for playback by the television station.

Figure 10:
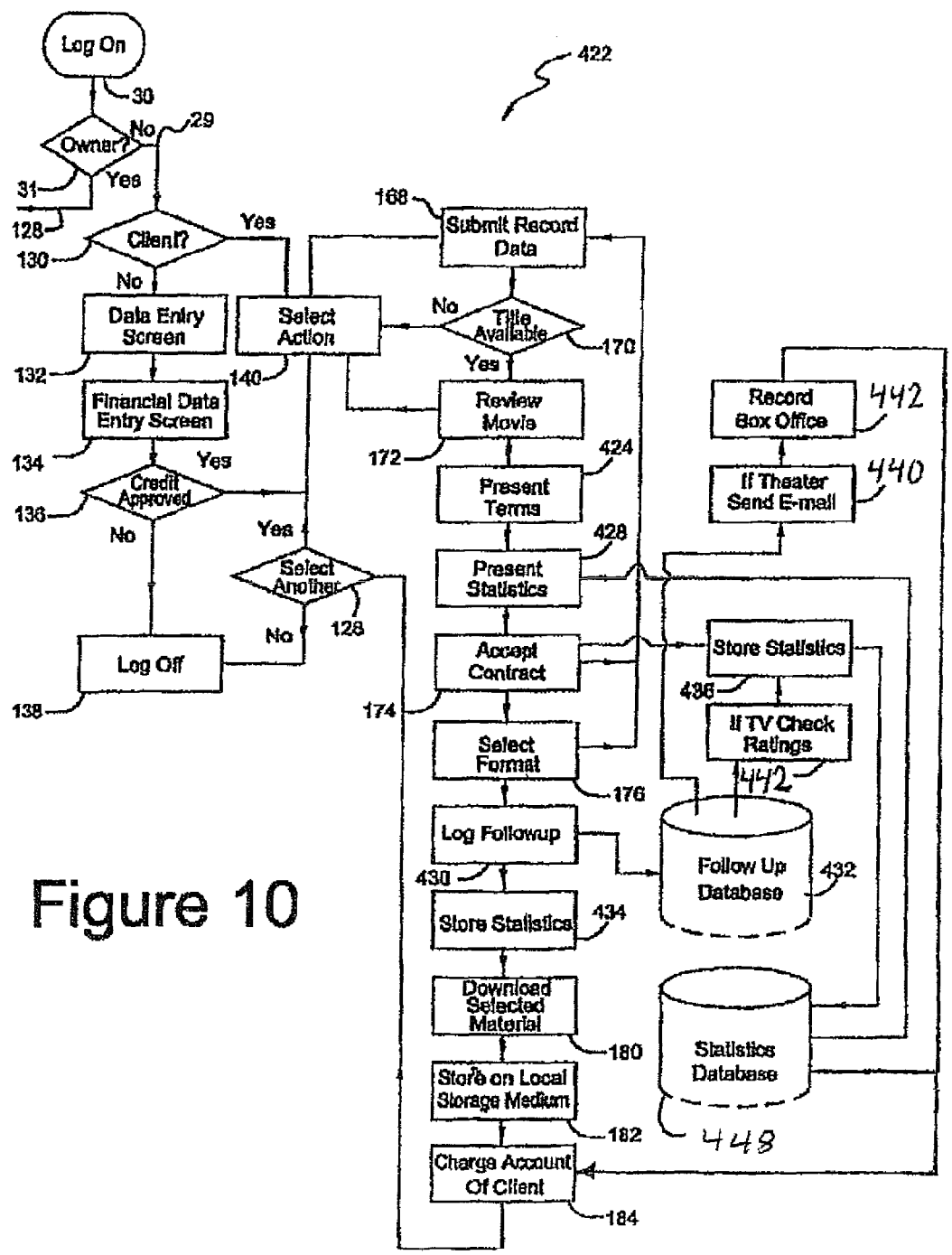
FIG. 10 is a flow chart, similar to a flow chart in FIG. 5, illustrating an alternative inventive method for obtaining product over the Internet while generating and providing statistical data.

A particularly advantageous embodiment of the system especially adapted to sales of audiovisual productions to television stations and theaters is illustrated in FIG. 10. In accordance with the embodiment of the system illustrated in FIG. 10, data is collected for the purpose of billing and also for the purpose of generating a database of information useful as a sales tool and as a device for assuring a high likelihood of exhibitor satisfaction with the delivered product.

In the system illustrated in FIG. 10, operation of system 422 is similar to the operation of the system illustrated in FIG.

5, and parts performing the same function have been given the same reference numerals. The description that follows is limited to those aspects of the system, which are different from the embodiment of FIG. 5.

In particular, in system 422 after a movie has been viewed at step 172 contract terms for commercial licensing of a production are presented at step 424. This is followed at step 426 with the presentation of statistics respecting the particular system at step 428. Such statistics may include past box office in cities of various sizes, with various language use characteristics, and so forth, such data being collected by the system during the course of a customer's signing up for the inventive service, and the customers using the inventive service.

After acceptance and format selection at steps 174 and 176, the system proceeds to log a follow-up at step 430 by sending information respecting the format selected to the database 432. This information is sent at step 434. At step 174, the system also proceeds to send information respecting the contract acceptance to database 432 at step 436. This includes the storage of statistics on such things as format, customer, customer location, other products combined with the subject product in the same order, title, nature of exhibitor, and so forth. This information is sent to a statistics database 438 at step 436. The system then proceeds to download the selected material at step 180, as illustrated in FIG. 5, and the material stored and the account of the client charged, or the transaction financially implemented by other means.

Follow-up database 432 is periodically queried for ripe follow-up data. Ripeness may be determined by any suitable means, including fixed periods, inquiries from the customer, detection of a problem, or the like. In response to a determination that a particular sale, previously made as described above, is right for inquiry, this information comes from database 432 and, in the case of a theater triggers the sending of an e-mail at step 440 or other communication to the theater requiring respecting the box office receipts. When this information is received, the system proceeds at step 442 to record the box office receipts and so this information to statistics database 438. In addition, the system also triggers the charging of the customers account in a second implementation of step 184.

In similar fashion, in the case of a customer that is a television station, the most applicable ratings at the time of the airing of the product are checked by the system at step 442. The statistics are then stored at step 436 and sent to statistics database 438. Such information can be made available on demand (for example by clicking on an appropriately labeled screen button) to any person using the automated ordering system as outlined above of the present invention, or it may be "pushed" without a customer demand (for example as a marketing tool to advertise or promote a particularly attractive product, or get a sale on a product about which the customer has already inquired about) at any point or points in the ordering cycle for multimedia product.

While the foregoing description and drawings represents the preferred embodiments of the present invention, it will be understood that various additions, modifications and substitutions may be made without departing from the spirit and scope of the present invention as defined in the accompanying claims. In particular, it will be clear that the present invention may be embodied in other specific forms, structures, arrangements, proportions, and with other elements, materials, and components, without departing from the spirit or essential characteristics thereof.

Figure 11:
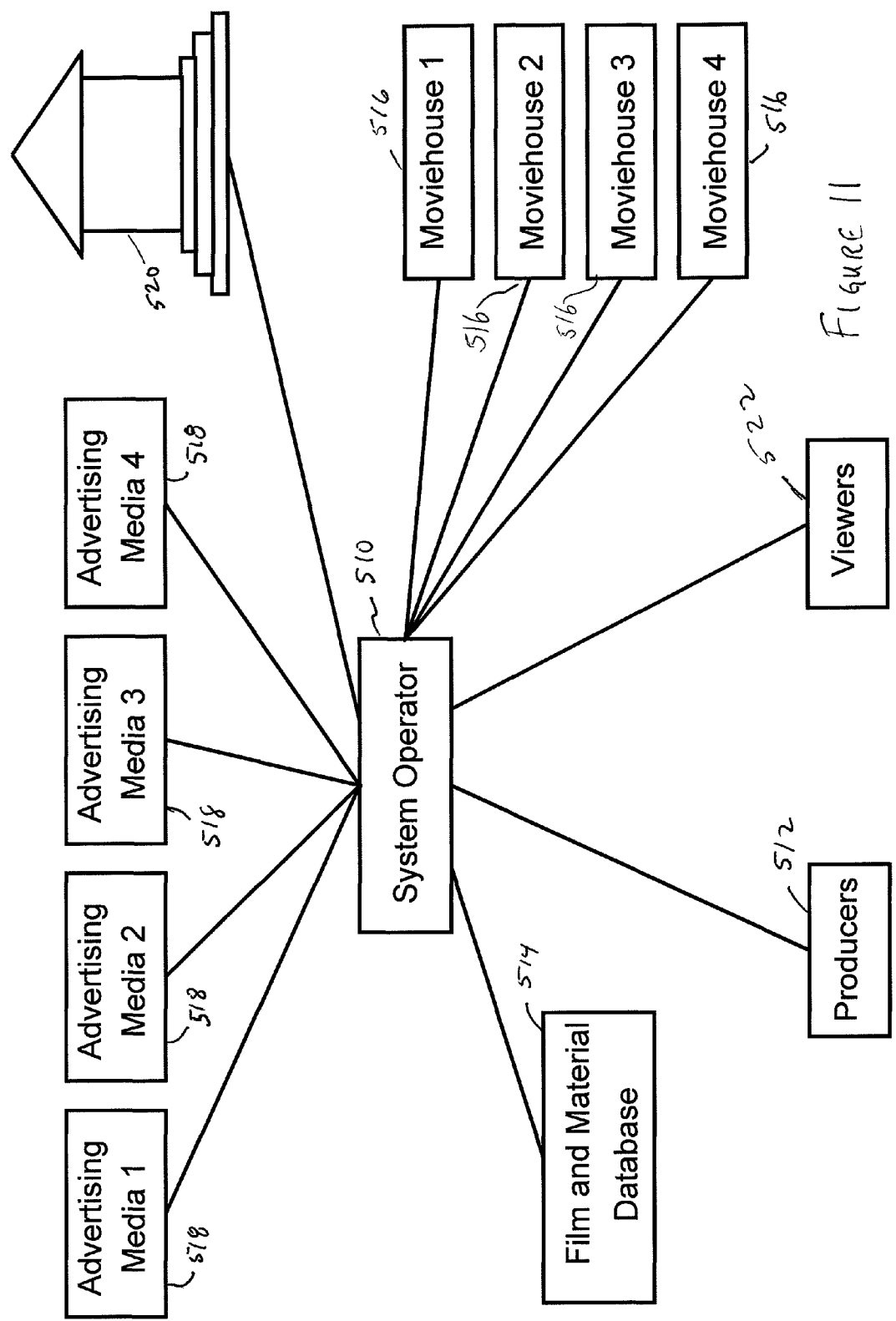
FIG. 11 illustrates an infrastructure for providing statistical data.

Turning to FIG. 11, in accordance with the invention, it is contemplated that the system operator 510 will receive information respecting the genre of the film, for example, children's, action, historical drama, comedy or drama.

Likewise, various media, such as radio, television, Internet and magazine advertising is also tracked by the system. In addition various advertising pieces, such as a 30 second radio spot, a television commercial or a newspaper advertisement may also be tracked for effectiveness. Similarly, the system may also evaluate individual performance of a particular radio station, television station, Internet blog, and so forth.

The assembly of information respecting the same is made possible by the system of FIG. 11. As illustrated the system operator 510 receives both film and promotional materials from producers 512 and stores this information in a database.

Reporting and cash collection is handled by system operator 510, with movie houses reporting ticket sales to system operator 510, causing the activation of, for example, wiring or credit card services at a bank 520, or a plurality of banks, at which movie houses 516 maintain accounts. In this manner movie houses may satisfy their obligations to the producer 512 by authorizing the transfer of cash to system operator 510 who passes the same on to producer 512.

Thus, the system operator accumulates information respecting all or most advertising media, or at least a large portion of the advertising media use, and box office information and thus has the data to determine the success of the particular media used.

In accordance with the invention, in its most preferred embodiment, the system operator 510 also places the advertising and this information in recorded by the system, thus making the system of FIG. 11 able to determine not only which media are successful but which advertising pieces are successful. It is also contemplated in accordance with the invention that sales to individual viewers may be satisfied by advertising inappropriate media outlets and receiving e-mails from viewers 522 which may be filled by download of, for example, a feature film.

The system operator thus functions as a central clearinghouse for collection of money, reporting of box office, placement of advertising, and selection of media, and thus has a large amount of information respecting the same. This information can be analyzed to generate more information which may be provided to the producer 512 and, for example, movie houses 516.

In particular, a particular media outlet, such as a newspaper or radio station can be analyzed for effectiveness by comparing it to similar analyses performed on other media outlets. For example, a television station may be analyzed by comparing its ability to draw moviehouse patrons for the same theater for other movies in the same genre. A further degree of sophistication may be added by normalizing the performance of each movie against the national popularity of the movie by looking at overall box office. Comparisons may be done looking at the amount of advertising done and the effectiveness in bringing in marginal revenue to determine the point at which profits are maximized.

Likewise, individual cinema houses may be analyzed to assess their effectiveness in attracting moviegoers as compared to other exhibition spaces, perhaps in the same city or in cities with similar demographics.

The effectiveness of Internet media may be judged against other Internet media on a national basis for movies of the same genre, or if the ordering of the movie is performed through the particular media being used, for the same movie.

Most importantly, the present invention allows the assessment of media or advertising materials during the run of a, for example, feature film. Because information is being collected in real time, with box office reports being sent daily or even twice-daily or continuously, advertising materials or media which are deemed to be particularly effective may be allocated more plays. In accordance with the invention this information is in the hands of the system operator 510, who is given the power to allocate advertising budgets by the movie houses 516 and/or the producers 512, thus allowing them to benefit from data as it is collected, and in that time frame calculated to take advantage of information generated in the course of the exhibition of a new movie. This also allows the producer to obtain the benefit of media experience and advertising material experience (for example of the same style) of other movies and other producers.

In accordance with the preferred embodiment of the invention, implementation of the previous steps described in connection with FIG. 11 are electronically implemented in accordance with software resident in the system.

The presently disclosed embodiments are therefore to be considered in all respects as illustrative and not restrictive. The metes and bounds of the invention are defined by the appended claims, and not limited to the foregoing description. Information respecting the ordering of, for example, a feature film by a, for example, movie house 516 or a number of movie houses 516 is sent to the system operator 510, who then places advertisements in different advertising media outlets 518, such as newspapers, radio stations, television stations, and so forth.

The invention claimed is:

1. A method of marketing and distributing multimedia, comprising:
   a. receiving, by a server, a motion picture and associated advertising material from a producer or owner of said multimedia material, said advertising material comprising a motion picture sequence with associated sound;
   b. storing said motion picture and associated advertising material on a computer readable storage medium in a digital format;
   c. providing a server system accessible over a communication network, said producer or owner being linked with the server system, said server system accessing said motion picture and associated advertising material stored in a digital format from said computer readable storage medium for transfer over said communication network;
   d. providing samples of said motion picture from said server system over said communication network to exhibitors, said exhibitors being linked to the server system;
   e. downloading, upon request of said exhibitors, over said communication network, said motion picture and associated advertising material stored in a digital format from said server system;
   f. storing said downloaded motion picture and displaying said motion picture at a particular time and place;
   g. storing said downloaded associated advertising material and displaying said advertising material at a time or in a place different from the place or time of exhibition of said motion picture;
   h. querying said exhibitor to stimulate the sending of ticket sales data from said exhibitor;
   i. recording said ticket sales data into a database for billing purposes; and
   j. reporting recorded ticket sales data to other exhibitors.

2. A method of distributing movies received from a movie owner, comprising:
   a. receiving, by a server, a movie and associated advertising material from said movie owner, said advertising material comprising a video component and an audio component synchronized to said video component;
   b. providing said movie in a digital format to a computer readable memory, storing said movie in digital format and said associated advertising material in digital format in said computer readable memory, such that said advertising material and said movie are linked;
   c. inputting licensing information about said movie;
   d. transferring said digital formats of said movie and said associated advertising material to a theater via a communications network;
   e. storing said digital formats of said movie and said associated advertising material on a computer readable memory located at said theater;
   f. transmitting over a network said licensing information to a potential exhibitor which operates a theater; and
   g. projecting said movie in said digital format using a digital projector onto a screen for display to an audience.

* * * * *